(12) United States Patent
Koo et al.

(10) Patent No.: US 10,907,023 B2
(45) Date of Patent: Feb. 2, 2021

(54) POLYMER HOLLOW PARTICLE, A METHOD OF PREPARING THE SAME, AND COMPOSITE COMPRISING THE POLYMER HOLLOW PARTICLE

(71) Applicant: KOREA INSTITUTE OF SCIENCE AND TECHNOLOGY, Seoul (KR)

(72) Inventors: Chong Min Koo, Seoul (KR); Soon Man Hong, Seoul (KR); Seung Sang Hwang, Seoul (KR); Kyung Youl Baek, Seoul (KR); Hyunchul Park, Seoul (KR); Seunggun Yu, Seoul (KR); Hyesung Cho, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 15/990,690

(22) Filed: May 28, 2018

(65) Prior Publication Data

US 2019/0016868 A1  Jan. 17, 2019

(30) Foreign Application Priority Data

Jul. 17, 2017  (KR) .................. 10-2017-0090379
May 4, 2018  (KR) .................. 10-2018-0052131

(51) Int. Cl.
| | | |
|---|---|---|
| *C08J 9/228* | (2006.01) | |
| *C08J 9/18* | (2006.01) | |
| *C08J 9/236* | (2006.01) | |
| *B29C 44/34* | (2006.01) | |
| *C23C 18/40* | (2006.01) | |

(Continued)

(52) U.S. Cl.
CPC .............. *C08J 9/228* (2013.01); *B01J 13/14* (2013.01); *B29C 44/3415* (2013.01); *B29C 44/3461* (2013.01); *B29C 44/445* (2013.01); *C08J 9/18* (2013.01); *C08J 9/236* (2013.01); *C08J 9/32* (2013.01); *C23C 18/1635* (2013.01); *C23C 18/405* (2013.01); *B29C 2035/0827* (2013.01); *C08J 9/141* (2013.01); *C08J 2203/14* (2013.01);
(Continued)

(58) Field of Classification Search
CPC ....... C08J 9/228; C08J 9/16; C08J 9/35; C08J 9/32; B01J 20/28021; B29C 44/00; B29C 65/4875
See application file for complete search history.

(56) References Cited

U.S. PATENT DOCUMENTS

| | | | | |
|---|---|---|---|---|
| 3,167,811 A | * | 2/1965 | Kraus .................. | B29C 35/007 425/217 |
| 4,550,003 A | * | 10/1985 | Sakata .................... | C08J 9/143 264/53 |

\* cited by examiner

*Primary Examiner* — Stella K Yi
(74) *Attorney, Agent, or Firm* — Cantor Colburn LLP

(57) ABSTRACT

A method of preparing a polymer hollow particle, a low-specific gravity and monodispersed polymer hollow particle of various shapes prepared using the method, and a composite including the polymer hollow particle are provided. The method includes: a first step of providing, onto a substrate including a engraved pattern, at least one expandable particle comprising a foaming agent-containing expandable core and a thermoplastic polymer shell; a second step of removing an excess of the at least one expandable particle from a resulting product of the first step; a third step of expanding the at least one expandable particle in the engraved pattern of the substrate by thermally treating a resulting product of the second step; and a fourth step of separating, from the substrate, expanded hollow polymer particles which are a resulting product of the third step.

14 Claims, 11 Drawing Sheets

(51) Int. Cl.
*B29C 44/44* (2006.01)
*B01J 13/14* (2006.01)
*C08J 9/32* (2006.01)
*C23C 18/16* (2006.01)
*C08J 9/14* (2006.01)
*B29C 35/08* (2006.01)

(52) U.S. Cl.
CPC ........ *C08J 2203/22* (2013.01); *C08J 2333/12* (2013.01); *C08J 2363/00* (2013.01)

POLYMER HOLLOW PARTICLE, A METHOD OF PREPARING THE SAME, AND COMPOSITE COMPRISING THE POLYMER HOLLOW PARTICLE

CROSS-REFERENCE TO RELATED APPLICATION

This application claims the benefit of Korean Patent Application Nos. 10-2017-0090379, filed on Jul. 17, 2017, and 10-2018-0052131, filed on May 4, 2018 in the Korean Intellectual Property Office, the disclosure of which is incorporated herein in its entirety by reference.

BACKGROUND

1. Field

One or more embodiments relate to polymer hollow particles, a method of preparing the same, and a composite including the polymer hollow particles, and more particularly, to a method of preparing hollow particles using expandable particles, hollow polymer particles prepared by the method, and a composite including the polymer hollow particles.

2. Description of the Related Art

Polymer particles are widely used in various fields, for example, sustained-release formulations, optic materials, chromatography media, and the like. Recently, research is being performed into using polymer particles as a building block for preparing a complex structure. In these fields of application, physical and chemical properties of polymer particles, including structure, size, shape, porosity, surface charge, hydrophilicity, and hydrophobicity, affect function of the particles. Accordingly, it may be crucial to introduce complexity into a particle structure and to uniformly control the function. Furthermore, designing polymer particles having various shapes and various physical and chemical properties may further expand the fields of application of the polymer particles.

Known methods of preparing polymer microparticles having a controlled shape and size include using a microfluidic system, controlling emulsion polymerization, and phase separation. However, it is not easy to control density characteristics of particles with these preparation methods, and the methods themselves are complicated. Therefore, there is a need for improvement in this regard.

SUMMARY

One or more embodiments include a method of preparing hollow polymer particles having various shapes using expandable particles by heat.

One or more embodiments include a monodispersed polymer hollow particle having a low specific gravity prepared using the method.

One or more embodiments include a composite including the polymer hollow particle.

Additional aspects will be set forth in part in the description which follows and, in part, will be apparent from the description, or may be learned by practice of the presented embodiments.

According to one or more embodiments, a method of preparing hollow polymer particles includes:

a first step of providing, onto a substrate including a engraved pattern, at least one expandable particle comprising a foaming agent-containing expandable core and a thermoplastic polymer shell;

a second step of removing an excess of the at least one expandable particle from a resulting product of the first step;

a third step of expanding the at least one expandable particle in the engraved pattern of the substrate by thermally treating a resulting product of the second step; and a fourth step of separating, from the substrate, expanded hollow polymer particles which are a resulting product of the third step.

In some embodiments, the substrate including the engraved pattern may have a line or hole pattern, and the polymer hollow particle may have a line or hole pattern on at least one surface thereof according to the line or hole pattern of the substrate.

According to one or more embodiments, there is provided a polymer hollow particle prepared according to the above-described method as a monodispersed particle comprising the expandable core and the thermoplastic polymer shell, the polymer hollow particle having a specific gravity of about 0.001 g/cm$^3$ to about 1 g/cm$^3$.

According to one or more embodiments, a composite includes: the above-described polymer hollow particle; and at least one material selected from amongan electrically conductive material, an electromagnetic shielding material, a thermally conductive material, and a polymer resin.

In some embodiments, the composite may have a structure comprising the polymer hollow particle; and a coating layer on a surface of the polymer hollow particle, the coating layer comprising at least one material selected from amongan electrically conductive material, an electromagnetic shielding material, a thermally conductive material, and a polymer resin, or may have a composite structure comprising the polymer hollow particle; and at least one material selected from among an electrically conductive material, an electromagnetic shielding material, a thermally conductive material, and a polymer resin.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
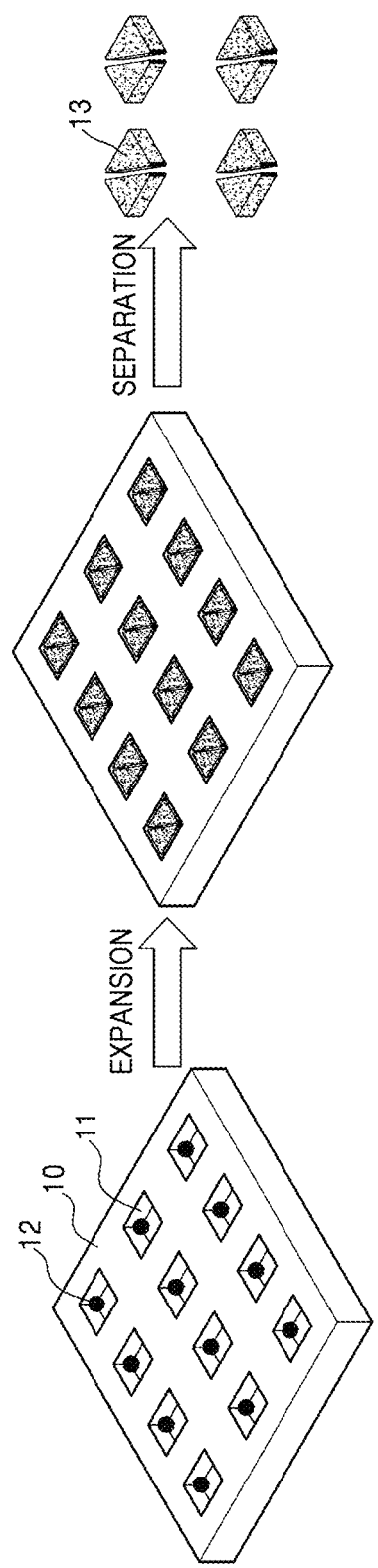
FIG. 1A is an illustration for explaining a method of preparing monodispersed hollow polymer particles according to an embodiment of the inventive concept.

Reference will now be made in detail to embodiments of polymer hollows particles, a preparing method thereof, and a composite including the polymer hollow particles, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

According to an aspect of the present disclosure, a method of preparing hollow polymer particles includes:

a first step of providing, onto a substrate including a engraved pattern, at least one expandable particle comprising a foaming agent-containing expandable core and a thermoplastic polymer shell;

a second step of removing an excess of the at least one expandable particle from a resulting product of the first step;

a third step of expanding the at least one expandable particle in the engraved pattern of the substrate by thermally treating a resulting product of the second step; and a fourth step of separating, from the substrate, expanded hollow polymer particles which are a resulting product of the third step.

Using the above-described method, monodispersed hollow polymer particles having various shapes and a low specific gravity may be easily prepared using thermally expandable particles.

The number of the at least one expandable particle provided into the engraved pattern of the substrate may be, whether dispersed or polydispersed, 1 or greater, for example, in a range of about 1 to about 1000, 1 to about 500, or 1 to about 100, to control the density and shape of the resulting expanded, monodispersed polymer hollow particles. The monodispersed hollow polymer particles as a target product may be prepared even with polydispersed expandable particles as a starting material. Such resulting hollow polymer particles may have a uniform size substantially without agglomeration of the particles.

As supported by results of diameter distribution analysis by dynamic light scattering, the hollow polymer particles may be uniform, monodispersed particles having a uniformly controlled particle diameter with a degree of dispersion of, for example, about 5% or less, about 1%, about 0.1% or less, about 0.01% or less, or about 0.0001 to 0.01%.

In the first step, the at least one expandable particle comprising the expandable core and the thermoplastic polymer shell may be provided onto the substrate including a engraved pattern in a wet manner by being mixed with a solvent. In other embodiments, the at least one expandable particle comprising the expandable core and the thermoplastic polymer shell may be provided onto the substrate in a dry manner, for example, by rubbing or spraying.

In the third step, the thermal treatment may be performed at a temperature of about 50° C. to about 170° C., for example, about 90° C. to about 120° C., for example, at about 100° C. to about 120° C. The thermal treatment may be performed at a heating rate of about 0.1° C./min to 20° C./min, for example, about 10° C./min. When the thermal treatment temperature and the heating rate are within these ranges, expansion of the expandable particles may be facilitated, and expanded hollow polymer particles having a desired polymer shell thickness may be obtained. When the heating rate is within the above-described ranges, the expandable particle(s) may remain intact without the occurrence of a structural defect or damage of the core and shell. As a result, the hollow polymer particles may have a higher true specific gravity than expected or may not undergo deterioration in physical properties with respect to thermal expansion, which may likely occur when the expansion rate is not controlled as desired.

The substrate including the depressed pattern is for example a mold having microwells and specific gravity.

When the expandable particle(s) is provided as an aqueous dispersion onto microwells of a mold (i.e., the substrate including a engraved pattern), the unnecessary solvent may be removed during the above-described thermal treatment process. Expansion of the expandable particle(s) may progress during the thermal treatment process. For example, the thermal treatment time may be varied within a range of about 1 second to about 24 hours.

The substrate including a engraved pattern may be manufactured from a thermocurable silicon polymer, for example, polydimethylsiloxane (PDMS) by a photoetching process.

After a silicon substrate is coated with a photosensitive resin, the silicon substrate may be selectively irradiated with ultraviolet (UV) rays through a photomask having a pattern in a various shape having a certain width and depth, for example, a circular, triangular, rectangular, pentagonal, or hexagonal shape, and then a non-UV irradiated region of the silicon substrate may be removed using a developing solution, resulting in a mold having a desired pattern.

PDMS as a thermocurable resin may be applied onto the thus-obtained mold, cured at a temperature of about 60° C. to 90° C. for about 10 hours to about 30 hours, and then separated from the silicon substrate. The resulting product may then be exposed under oxygen atmosphere to induce formation of a hydrophilic chemical group on a surface thereof. As a result of the thermal curing of the PDMS applied flat onto the mold, a PDMS channel member substrate may be obtained.

The PDMS channel member substrate made flat may be placed onto the PDMS substrate including a engraved pattern in a various shape and then integrated together to thereby manufacture a device.

The size of the engraved pattern is not specifically limited. The size of the engraved pattern may be varied depending on the size of a target polymer hollow particle. The shape of the expanded polymer hollow particle may be controlled by controlling the shape of the engraved pattern in a thickness direction.

With the assumption that the engraved pattern has N sides on a plane and a side length A, wherein N indicates the number of sides and A indicates the length of a side, when N is varied within a range of about 1 to 100 and each side has a same length A, the engraved pattern may form an expanded polymer hollow particle having a various isotropic shape from the expandable particle.

With the assumption that the engraved pattern has N sides on a plane and a side length A, wherein N indicates the number of sides and A indicates the length of a side, when N is varied within a range of about 1 to 100 and the length A of each side is not the same, the engraved pattern may form an expanded polymer hollow particle having a various anisotropic shape from the expandable particle.

A width and depth of the engraved pattern are not specifically limited. For example, the depressed patter may have a width of about 10 nm to about 1,000 μm and a height of about 10 nm to about 1,000 μm.

In the middle of the thermal treatment process, an aging process may be performed for about 1 minute to about 100 minutes. Through this aging process, the expandable particle may have an increased expansion ratio, and unnecessary air may be removed.

In some embodiments, in the method of preparing a polymer hollow particle(s) as described above, the mold may be manufactured to have a various shape, for example, a circular, square, or rectangular shape according to a shape of the target polymer hollow particle(s).

Figure 1B:
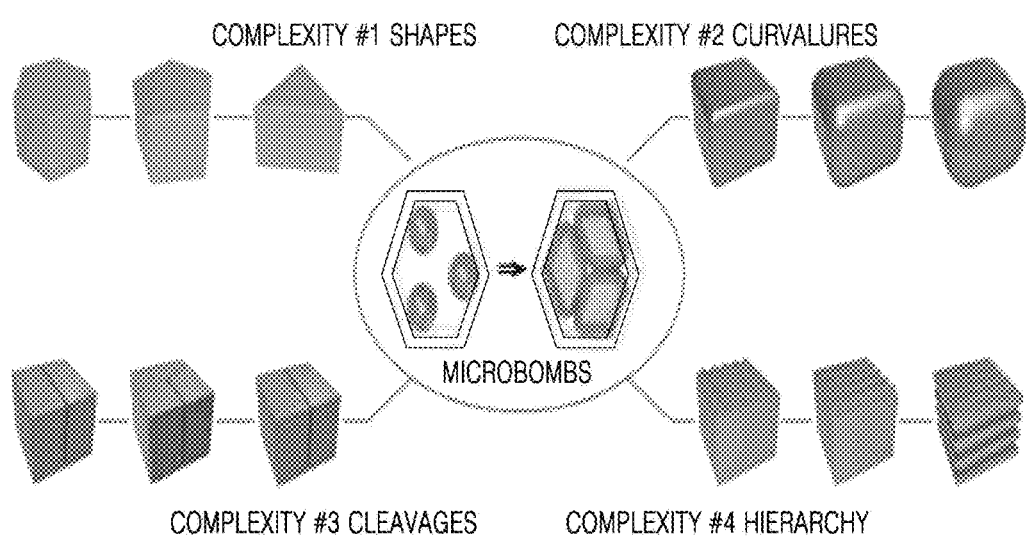
FIG. 1B is an illustration for explaining characteristics of hollow polymer particles according to embodiments of the inventive concept.
Figure 1C:
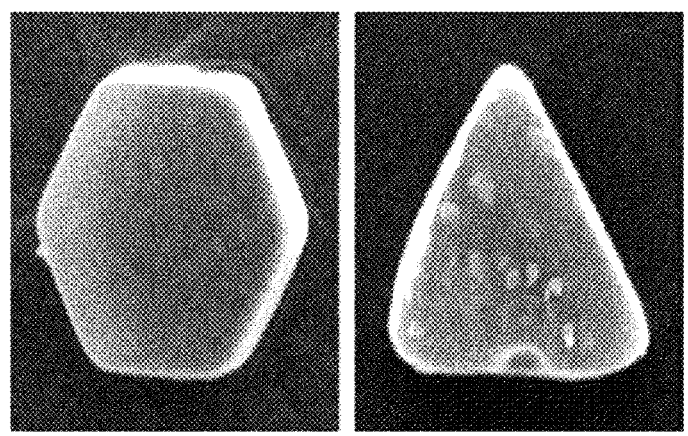
FIGS. 1C to 1F are optical microscopy images of hollow polymer particles according to embodiments of the inventive concept.
Figure 1D:
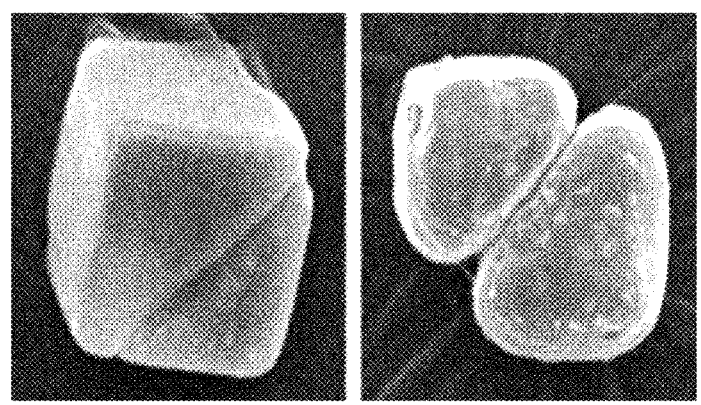
Figure 1E:
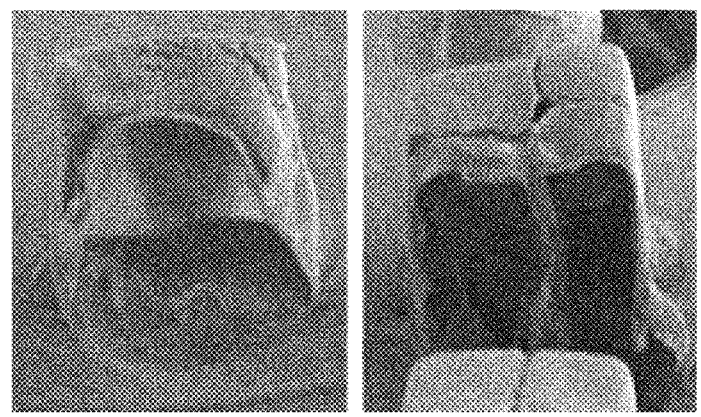

In some embodiments, it may be easy to freely control the shape of the polymer hollow particle as represented in FIG. 1B (see Complexity #1 in FIG. 1B and FIG. 1C). In some embodiments, the edges of the polymer hollow particle may be made round or sharp by controlling, for example, the thermal treatment temperature (see Complexity #2 in FIG. 1B and FIG. 1D). As shown in FIG. 1C, the number of particles constituting one polymer hollow particle may be controlled as desired. For example, one polymer hollow particle may include one, two, or three particles (see Complexity #3 in FIG. 1B and FIG. 1E). For example, one polymer hollow particle may be in the form of one-body particle, a primary particle, or a secondary particle. A secondary particle refers to an aggregate of primary particles. When the polymer hollow particle according to an embodiment is one-body particle, the polymer hollow particle may have nearly no grain boundary.

In some embodiments, the hollow polymer particles may be surface-treated to prevent agglomeration and binding between the particles. The surface treatment may be coating with, for example, a fluorine material. For example, the fluorine material may be a low-molecular weight material such as 1,1-difluoroethane.

Figure 1F:
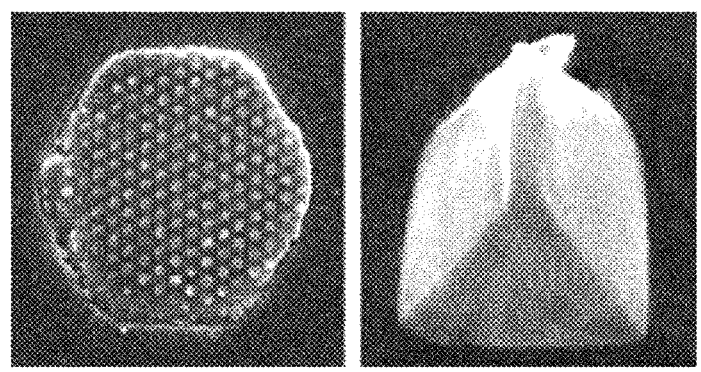

In some embodiments, the polymer hollowparticles may have any desired pattern, for example, holes or lines, on an outer surface (a upper surface, a lower surface, andor a side thereof) (see Complexity #4 in FIG. 1B and FIG. 1F).

For example, the amount of the core in the expandable particle may be about 2 wt % to about 85 wt %, and in some embodiments, about 0.1 wt % to 5.0 wt %, and in some other embodiments, about 1 wt % to 3 wt %, based on a total weight of the expandable particle. For example, the amount of the thermoplastic polymer shell may be about 95 wt % to about 99.9 wt % based on the total weight of the expandable particle. The thermoplastic polymer shell may have a thickness of about 0.1 μm to about 10 μm.

The expandable particle(s) may have an average particle diameter of, for example, about 0.2 μm to about 50 μm.

The foaming agent in the at least one expandable particle may expand the expandable particle to a volume expansion ratio of about 10 times or greater, for example, about 0.01 time to about 10 times, when heated at a temperature greater than or equal to a softening point of the thermoplastic resin in the polymer shell.

In some embodiments, the polymer hollow particle may have a large inner pore, and thus may be used as a mixture with a filler in a polymer substrate for use as a low-specific gravity structure. When the polymer hollow particle according to an embodiment is used as a filler, it may be easy to freely control various characteristics of a target product, including density, transparency, refractive index, sound proofing and insulating properties, as desired.

The thermoplastic resin in the thermoplastic polymer shell may be a polymer obtained from a polymerizable monomer or a polymer obtained as a reaction product of a polymerizable monomer and a cross-linking agent. The polymerizable monomer may be at least one selected from the group consisting of a nitrile monomer, a carboxylic acid monomer, a (meth)acrylic acid ester monomer, an acrylamide monomer, a maleimide monomer, a styrene monomer, a vinyl ether monomer, a vinyl ketone monomer, an aromatic divinyl monomer, a N-vinyl monomer, a halogenated vinyl monomer, and a combination thereof.

Non-limiting examples of the nitrile monomer may be acrylonitrile, methacrylonitrile, a-chloracrylonitrile, a-ethoxyacrylonitrile, and fumaronitrile. Non-limiting examples of the carboxylic acid monomer may be a carboxylic acid monomer such as acrylic acid, methacrylic acid, itaconic acid, maleic acid, fumaric acid, and citraconic acid; vinylidene chloride, vinyl acetate; methyl(meth)acrylate, ethyl(meth)acrylate, normal butyl(meth)acrylate, isobutyl (meth)acrylate, tertiary butyl(meth)acrylate, isobornyl (meth)acrylate, cyclohexyl(meth)acrylate, benzyl(meth) acrylate, and carboxyethylene acrylate. Non-limiting examples of the styrene monomer may be styrene, o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, n-methoxystyrene, p-phenylstyrene, p-chlorostyrene, and 3,4-dichlorostyrene. Non-limiting examples of the acrylamide monomer may be acrylamide, substituted acrylamide, methacrylamide, and substituted methacrylamide. Non-limiting examples of the maleimide monomer may be N-phenyl maleimide, N-(2-chlorophenyl) maleimide, N-cyclohexyl maleimide, and N-lauryl maleimide.

Non-limiting examples of the vinyl ether monomer may be vinyl methyl ether, vinyl ethyl ether, and vinyl isobutyl ether. Non-limiting examples of the vinyl ketone monomer may be vinyl methyl ketone, vinyl hexyl ketone, and methyl isoprophenyl ketone. Non-limiting examples of the aromatic divinyl monomer may be divinyl benzene and divinyl naphthalene. Non-limiting examples of the (meth)acrylic acid ester monomer may be methyl(meth)acrylate, ethyl(meth) acrylate, n-butyl (meth)acrylate, isobutyl(meth)acrylate, t-butyl(meth)acrylate, propyl(meth)acrylate, n-octyl(meth) acrylate, dodecyl(meth)acrylate, 2-ethylhexyl(meth)acrylate, stearyl(meth)acrylate, 2-chloroethyl(meth)acrylate, phenyl(meth)acrylate, isobornyl(meth)acrylate, cyclohexyl (meth)acrylate, benzyl(meth)acrylate, β-carboxyethyl acrylate, 2-hydroxyethyl(meth)acrylate, and 2-hydroxypropyl (meth)acrylate. Non-limiting examples of the N-vinyl monomer may be N-vinylpyrrole, N-vinylcarbazole, N-vinylindole, and N-vinylpyrrolidone. Non-limiting examples of the halogenated vinyl monomer may be vinyl chloride, vinylidene chloride, vinyl bromide, and vinyl fluoride.

The cross-linking agent may be, for example, at least one selected from the group consisting of allyl methacrylate, triacryl formal, triallyl isocyanate, ethylene glycol di(meth) acrylate, diethylene glycol di(meth)acrylate, triethylene glycol di(meth)acrylate, 1,4-butanediol di(meth)acrylate, 1,9-nonanediol di(meth)acrylate, 1,10-decanediol di(meth) acrylate, polyethylene glycol di(meth)acrylate, neopentyl glycoldi(meth)acrylate, trimethylolpropane trimethacrylate, glycerol dimethacrylate, dimethylol tricyclodecane diacrylate, pentaerythritol tri(meth)acrylate, pentaerythritol tetraacrylate, dipentaerythritol hexaacrylate, neopentyl glycol acrylate benzoate, trimethylol propane acrylate benzoate, 2-hydroxy-3-acryloyloxy propyl methacrylate, hydroxypivalic acid neopentyl glycol diacrylate, ditrimethylolpropane tetraacrylate, 2-butyl-2-ethyl-1,3-propanediol diacrylate, and a combination thereof. For example, polyethylene glycol of the polyethylene glycol di(meth)acrylate may have a weight average molecular weight of about 200, 400, or 600.

The foaming agent in the core of the expandable particle may include a non-fluorine hydrocarbon compound having a low boiling point that may be present in a gaseous phase at a temperature equal to or lower than a softening point of a thermoplastic resin of the thermoplastic polymer shell.

The foaming agent may maintain an initial decomposition temperature of, for example, about 150° C. or greater, and may maintain a maximum degree of expansion at a temperature of about 210° C. to about 240° C. The core of the expandable particle may include a foaming agent having a thermal expansion onset temperature of about −20° C. to about 150° C., for example, about −15° C. to about 100° C., or about −12° C. to about 50° C., and a maximum thermal expansion temperature of about 160° C. to about 170° C.

The amount of the expandable core may be about 5 wt % to about 30 wt % based on a total weight of the expandable particle. The foaming agent may be, for example, at least one selected from among propane, propylene, butene, normal butane, isobutane, isopentane, neopentane, normal pentane, normal hexane, isohexane, heptane, octane, petroleum ether, halogenated methane, tetra alkylsilane, and azodicarbonamide.

For example, the thermoplastic resin forming the thermoplastic polymer shell may be a terpolymer including a (meth)acryl first repeating unit as an essential component, a nitrile second repeating unit, and a third repeating unit having no reactivity with the (meth)acryl first repeating unit and the nitrile second repeating unit.

The thermoplastic resin may include the first repeating unit and the second repeating unit in any a certain ratio. In some embodiments, the amount of the (meth)acryl first repeating unit may be about 10 wt % to about 50 wt %, for example about 15 wt % to about 30 wt % based on a total weight of the thermoplastic resin. The amount of the nitrile second repeating unit may be about 30 wt % to about 80 wt %, for example, about 35 wt % to about 50 wt %, based on based on a total weight of the first to third repeating units in the thermoplastic resin.

The third repeating unit may be, for example, at least one selected from among polyvinylchloride, N-methylol(meth)acrylamide, N,N-dimethylaminoethyl(meth)acrylate, N,N-dimethylaminopropyl(meth)acrylate, magnesiummono(meth)acrylate, zinc mono(meth)acrylate, vinylglycidylether, prophenylglycidylether, glycidyl(meth)acrylate, 2-hydroxyethyl(meth)acrylate, 2-hydroxypropyl(meth)acrylate, 2-hydroxybutyl(meth)acrylate, and 2-hydroxy-3-phenoxypropyl(meth)acrylate.

The thermoplastic resin may include the first repeating unit, the second repeating unit, and the third repeating unit in any a certain ratio. The amount of the third repeating unit may be about 10 wt % to about 50 wt %, for example, about 35 wt % to about 45 wt %, based on a total weight of the thermoplastic resin.

The thermoplastic resin may be, for example, a vinylchloride-co-acrylonitrile-co-methyl methacrylate copolymer. The amount of the acrylonitrile repeating unit may be about 10 wt % to about 50 wt %, the amount of the methyl methacrylate repeating unit may be about 30 wt % to about 80 wt %, and the amount of the vinyl chloride repeating unit may be about 10 wt % to about 50 wt %, (each based on a total weight of the thermoplastic resin.)

When using the expandable particle including a polymer shell having the above-described composition, the resulting polymer hollow particle after expansion may have a desired polymer shell thickness. After completion of the expansion, the expandable particle may remain intact without structural defect or damage of the core and shell, and the polymer hollow particle may have an improved specific gravity and improved thermal expansion property.

Hereinafter, embodiments of a method of preparing hollow polymer particles according to any of the embodiments will be described in greater detail.

At least one expandable particle including a foaming agent-containing expandable core and a thermoplastic polymer shell may be provided into microwells of a mold as a substrate including a engraved pattern. The at least one expandable particle may be provided in the form of powder without a solvent onto the substrate in a dry manner, for example, by rubbing or spraying into the microwells.

Even when the expandable particle provided into the microwells is a polydispersed particle, the resulting final polymer hollow particle may be a monodispersed particle having a high degree of dispersion.

When hollow polymer particles according to embodiments are prepared using a wet process, it may be essential to use a mold cover and dock the particles and evaporate a solvent used in dispersion of the particles in the microwells of the mold. It may also be essential to precisely control the affinity and surface energy of the solvent to the mold used in the wet process. In addition, for mass-scale production of the polymer hollow particles, it may be essential to uniformly control the evaporation of the solvent.

Preparing hollow polymer particles according to an embodiment using a wet process will now be described in greater detail.

In a method of preparing hollow polymer particles using a wet process, at least one expandable particle may be provided onto a substrate in the same manner as in a dry method, except that the expandable particle is provided into the microwells of the substrate in the form of an expandable particle dispersion in a solvent, instead of powder form.

The solvent may be, for example, water. The amount of the solvent may be about 1 part to about 99 parts by weight based on 100 parts by weight of the expandable particle.

A PDMS channel member substrate may be placed onto a polydimethylsiloxane (PDMS) substrate including a engraved pattern and then integrated together to thereby manufacture a device. The expandable particle-containing dispersion may be supplied to the microwells of the PDMS substrate (mold) having the engraved pattern through the channels in the PDMS channel member substrate.

The mold may be a soft mold using a polymer such as polyurethane or polydimethylsiloxane, or may be a hard mold such as a metal mold. The soft mold may be easily manufactured from a silicon master mold through a simple duplication process.

Preparing hollow polymer particles using a dry process may be simpler and easier than the above-described wet preparation process since the additional process and equipment required in the wet process are not needed. Using such a dry process may be advantageous since a PDMS channel member substrate used in the wet process to supply the expandable particle-containing dispersion is not required.

In the dry preparation process, after the spraying of the expandable particles into the microwells, a taping process using an adhesive tape, a blowing process, or a process of applying ultrasonic waves may be performed. The taping process is for removing the remaining expandable particles using tape. The excess expandable particles remaining in the microwells may be removed through the blowing process or the process of applying ultrasonic waves. The taping process may more effectively remove an excess of the expandable particles than the blowing process and the process of applying ultrasonic waves.

Through the above-described taping process, blowing process, or process of applying ultrasonic waves, the expandable particles may be appropriately supplied into the microwells of the mold so that desired hollow polymer particles are obtained.

After the at least one expandable particle is supplied into the microwells of the mold in a wet or dry manner as described above, thermal treatment may be performed. The thermal treatment may be performed in a range of temperatures higher than a glass transition temperature of the thermoplastic resin which forms the shell of the expandable particle.

The resulting product from the first step may be thermally treated to expand the expandable particle supplied into the engraved pattern (of the substrate).

A polymer hollow particle completely expanded resulting from the second step, may then be separated from the substrate. In other words, after being completely expanded in the mold, the polymer hollow particle may be separated from the mold. The polymer hollow particle may be separated from the mold by using transonic waves, a water-soluble tape or blowing.

In the method of preparing polymer hollow particles, according to an embodiment, hollow polymer particles may be obtained in the form of one-body particles, primary particles or secondary particles according to a thermal treatment temperature, thermal treatment time, or whether surface treatment has been performed or not.

The hollow polymer particles may have a coating layer on a surface thereof formed by surface treatment with a fluorine material. The hollow polymer particles obtained through such surface treatment may be one-body particles substantially without grain boundary due to suppressed agglomeration and binding of the particles. For example, the fluorine material may be a low-molecular weight material such as 1,1-difluoroethane.

According to another aspect of the present disclosure, there are provided hollow polymer particles prepared using a method according to an embodiment as described above, as monodispersed particles including an expandable core and a thermoplastic polymer shell as described above and having a specific density of about 0.001 g/cm$^3$ to about 1 g/cm$^3$ and a degree of dispersion of about 5% or less.

In some embodiments, hollow polymer particles having various shapes may be prepared through low-temperature heating and a short process. In some embodiments, edges of the hollow polymer particles may be precisely controlled by changing temperature and expansion pressure conditions. It may also be possible to control the density of the hollow polymer particles by varying the number of particles or degree of expansion. A pattern of high precision may be implemented with high expansion pressure.

According to another aspect of the present disclosure, a composite includes a polymer hollow particle according to any of the above-described embodiments.

The composite may include a polymer hollow particle according to any of the above-described embodiments and at least one material selected from among an electrically conductive material, an electromagnetic shielding material, a thermal conductive material, and a polymer resin. The polymer resin is a thermoplastic resin or a thermocurable resin.

In some embodiments, the at least one material selected from among a conductive material, an electromagnetic shielding material, a thermal conductive material, a thermoplastic resin and a thermocurable resin may be included in the coating layer on the surface of the polymer hollow particle. In some other embodiments, the at least one material selected from among a conductive material, an electromagnetic shielding material, a thermal conductive material, a thermoplastic resin and a thermocurable resin may form a composite with the polymer hollow particle.

In some embodiments, the composite may be used as a filler. The composite may have a particle size of, for example, about 100 nm to about 100,000 nm. The size of the composite may refer to an average particle diameter when the composite is spherical, or may refer to a length of the major axis when the composite is nonspherical.

As described above, The composite may include a polymer hollow particle according to any of the embodiments and at least one material selected from among a conductive material, an electromagnetic shielding material, a thermal conductive material, a thermoplastic resin, and a thermocurable resin.

For example, the at least one material may be at least one selected from the group consisting of Al, Ag, Au, Cu, Ni, Sn, Pt, Si, Ge, In, Sb, Pb, Bi, Cd, Zn, Mo, W, Ti and a combination thereof. For example, the at least one material may be at least one selected from CuO, Cu$_2$O, SiO, Fe$_2$O$_3$, Fe$_3$O$_4$, CaO, B$_2$O$_3$, B$_2$O, B$_6$O, Al$_2$O$_3$, BeO, ZnO, MgO, SiC, AlN, SiN, BN, BCN, titanium carbide (Ti$_x$C$_y$), titanium nitride (Ti$_x$N$_y$), titanium carbonitride (Ti$_x$C$_y$N$_z$), carbon nanotubes (CNT), graphite, graphene, diamond, fullerene, carbon black, and a combination thereof.

The thermoplastic resin and the thermocurable resin may be any ones widely known in the art.

The composite may be prepared to have a various particle shape, structure, and composition. Accordingly, the density, electrical conductivity, electromagnetic shielding characteristics, and thermal conductive characteristics of the composite may be efficiently controlled. The low density, large surface area, and surface characteristics of the composite may be controlled, so that the composite may be useful in a biomaterial, a chemical material, a fusion material, and a constructive material.

When hollow polymer particles according to any of the above-described embodiments or a composite including the polymer hollow material are applied to a biomaterial, functional particles for an effective drug delivery and release system may not be limited to spherical particles but may be prepared in the form of anisotropic particles or hollow particles. When hollow polymer particles according to any of the above-described embodiments or a composite including the polymer hollow material are applied to a construction material, a construction and exterior materials of lighter weight may be easily obtained by being filled with the polymer hollow particle or a composite including the same, beyond the limit to which spherical particles may be packed (beyond the limitation of spherical particles in closest packing).

When hollow polymer particles according to any of the above-described embodiments or a composite including the polymer hollow material are applied to a photonic crystalline material, a novel photonic crystalline structure which has not previously existed may be implemented with anisotropic particles according to embodiments, and a nextgeneration photoelectric device may be manufactured using the photonic crystalline structure. Hollow polymer particles according to any of the embodiments and a composite including the same are nanoparticles which may be applicable to a variety of fields, including optic materials, intelligent drug delivery and release systems, small electronic circuits, biosensors, and catalyst supports.

One or more embodiments of the present disclosure will now be described in detail with reference to the following examples. However, these examples are only for illustrative purposes and are not intended to limit the scope of the one or more embodiments of the present disclosure.

Example 1

Preparation of Polymer Hollow Particle

A substrate including a engraved pattern(referred to also as a mold having a pattern or microwells) was manufactured using poly(dimethylsiloxane) (PDMS) known as a thermocurable silicon polymer using a photoetching process.

First, after a silicon substrate was coated with a photosensitive resin and then selectively irradiated with ultraviolet (UV) rays through a photomask, a non-UV irradiated region of the silicon substrate was removed using a developing solution to obtain a mold having a desired pattern.

The thermocurable polymer PDMS was then coated on the obtained mold, cured at a temperature of about 80° C. for about 24 hours, and then separated from the silicon substrate, thereby manufacturing a PDMS substrate A including a engraved pattern.

A PDMS channel member substrate with channels was mounted on the PDMS substrate A including a engraved pattern and then integrated together to thereby manufacture a device. An expandable particle-containing dispersion prepared as described below was then supplied through the channels of the PDMS channel member substrate into the microwells of the PDMS substrate A (mold). The PDMS channel member substrate was treated with oxygen plasma for about 1 minute to induce hydroxyl groups as hydrophilic chemical groups on a surface of the PDMS channel substrate, so as to facilitate smooth and uniform supply of the expandable particle-containing dispersion into the microwells of the PDMS substrate A through the channels of the PDMS channel member substrate.

The expandable particle-containing dispersion was prepared by dispersing two expandable particles (461 DU, SEKISUI) having a diameter of about 10 μm in water. The amount of the expandable particles in the expandable particle-containing dispersion was about 1 wt %.

The expandable particles used were in the form of powder including an isobutane core and a vinylidene chloride-co-acrylonitrile-co-methyl methacrylate copolymer shell. The vinylidene chloride-co-acrylonitrile-co-methyl methacrylate copolymer included vinylidene chloride, acrylonitrile and methyl methacrylate repeating units in a weight ratio of about 25:35:40.

After the supplying of the expandable particle-containing dispersion, the PDMS channel member substrate was separated from the resulting product (the PDMS substrate A) and then a channel-free flat PDMS substrate (referred also as a mold cover) was bound to the PDMS substrate A. The resulting product was then placed into a hot stage and then heated to about 100° C. at a rate of about 10° C./min to expand the expandable particles, thereby preparing expanded polymer hollow particles.

Next, the channel-free flat PDMS substrate (mold cover) was separated from the device including the expanded hollow polymer particles prepared through the above-described processes.

The expanded hollow polymer particles in the engraved pattern of the PDMSsubstrate A were separated from the PDMS substrate A using a water-soluble adhesive tape (available from Clover Mfg Co., Ltd), which was attached to an upper surface of the PDMS substrate and gently detached therefrom. Next, the water-soluble adhesive tape with the expanded hollow polymer particles attached thereto was dissolved in water to isolate the expanded hollow polymer particles from the same, thereby obtaining target monodispersed hollow polymer particles having a rectangular shape.

Example 2

0.1 g of expandable particles were placed into the microwells (having a depth of about 20 μm and a width of about 20 μm) of the PDMS substrate A (mold) obtained according to Example 1, and then rubbed with a planar PDMS block in one direction to be filled into the microwells of the mold. Next, a common 3M Scotch tape was attached to an upper surface of the mold with the microwells filled with the expandable particles and then detached therefrom to remove an excess of the expandable particles. These processes were repeated three times until the mold was filled with a minimum amount of the expandable particles sufficient to shape the particles.

The expandable particles used were in the form of powder including an isobutane core and a vinylidene chloride-co-acrylonitrile-co-methyl methacrylate copolymer shell. The vinylidene chloride-co-acrylonitrile-co-methyl methacrylate copolymer included vinylidene chloride, acrylonitrile and methyl methacrylate repeating units in a weight ratio of about 25:35:40.

The resulting product obtained through the above processes was bound with a channel-free flat PDMS substrate (referred also as a mold cover). The resulting product was then placed into a hot stage and then heated to about 100° C. at a rate of about 10° C./min to expand the expandable particles, thereby preparing expanded polymer hollow particles.

The expanded hollow polymer particles in the engraved pattern of the PDMS substrate were separated from the PDMS substrate A using a water-soluble adhesive tape (available from Clover Mfg Co., Ltd), which was attached to an upper surface of the PDMS substrate and gently detached therefrom. Next, the water-soluble adhesive tape with the expanded hollow polymer particles attached thereto was dissolved in water to isolate the expanded hollow polymer particles from the same, thereby obtaining target monodispersed hollow polymer particles having a rectangular shape.

Example 3

Preparation of Polymer Hollow Particle/Epoxy Resin Composite

A room temperature-curable epoxy resin and a curing agent were mixed in an equivalence ratio. After the resulting mixture was poured into a mold prepared according to Example 1, the mold containing the resulting mixture was placed into a Revolution centrifugal mixer and spun at about 1000 rpm for about 5 minutes, thereby preparing an epoxy mixture(epoxy melt) as a uniform mixture of the epoxy resin and the curing agent.

After 10 g of the hollow polymer particles prepared according to Example 1 was mixed with 10 g of theepoxy mixture(epoxy melt), the mixture was further mixed in a Revolution centrifugal mixer at about 1000 rpm for about 5 minutes, thereby preparing a polymer hollow particle/epoxy resin composite.

Example 4

Preparation of Polymer Hollow Particle/Epoxy Resin Composite 10 g of the hollow polymer particles prepared according to Example 1 were treated with an acid to remove impurities from the surfaces thereof, thereby preparing first polymer hollow particles.

After an electroless copper solution including 7 mL of an aqueous solution of copper sulfate ($CuSO_4 \cdot 5H_2O$) as a copper salt, 0.7 mL of formaldehyde (HCHO) as a reducing agent, and 2.8 g of ethylene diamine tetraacetic acid ($C_{10}H_{16}N_2O_8$) as a complexing agent was prepared, the first hollow polymer particles were dipped in the electroless copper solution for about 120 minutes and stirred to prepare hollow polymer particles having a copper coating layer.

A mixture of an epoxy resin and a curing agent in a calculated equivalence ratio was poured into a mold. This mold was then placed into a Revolution centrifugal mixer and spun at about 1000 rpm for about 5 minutes, thereby preparing an epoxy mixture(epoxy melt) as a uniform mixture of the epoxy resin and the curing agent.

10 mL of the hollow polymer particles having the copper coating layer was mixed with 10 g of theepoxy mixture (epoxy melt), and then further mixed in a Revolution centrifugal mixer at about 1000 rpm for about 5 minutes, thereby preparing a polymer hollow particle/epoxy resin composite.

Example 5

Hollow polymer particles having a spherical shape were prepared in the same manner as in Example 1, except that a device obtained by integrating the PDMS substrate A including a engraved pattern with a channel-free flat PDMS substrate according to Example 1 was placed into a hot stage and then heated to about 90° C., instead of 100° C., at a rate of about 20° C./min.

Example 6

Hollow polymer particles having a triangular shape with sharp edges were prepared by expanding expandable particles in the same manner as in Example 1, except that a device obtained by integrating the PDMS substrate A including a engraved pattern with a channel-free flat PDMS substrate according to Example 1 was placed into a hot stage and then heated to about 110° C., instead of 100° C., at a rate of about 20 C/min.

Example 7

Hollow polymer particles were prepared in the same manner as in Example 1, except that the channel-free flat PDMS substrate (mold cover) was modified to have a nano line pattern (having a line width of about 600 nm), the microwells of the PDMS substrate A including a engraved pattern had a circular shape, and one expandable particle was placed in each of the microwells.

Example 8

Hollow polymer particles were prepared in the same manner as in Example 7, except that two expandable particles were placed in each of the microwells of the PDMS substrate A including a engraved pattern.

Example 9

Hollow polymer particles were prepared in the same manner as in Example 1, except that the channel-free flat PDMS substrate (mold cover) was modified to have a nano line pattern, and one expandable particle was placed in each of the microwells of the PDMS substrate A including a engraved pattern.

Example 10

Hollow polymer particles were prepared in the same manner as in Example 9, except that two expandable particles were placed in each of the microwells the PDMS substrate A including a engraved pattern.

Example 11

Hollow polymer particles were prepared in the same manner as in Example 1, except that the channel-free flat PDMS substrate (mold cover) was modified to have a nano line pattern, the microwells of the PDMS substrate A including a engraved pattern had a rectangular shape, and one expandable particle was placed in each of the microwells.

Example 12

Hollow polymer particles were prepared in the same manner as in Example 11, except that two expandable particles were placed in each of the microwells of the PDMS substrate A including a engraved pattern.

Example 13

Hollow polymer particles were prepared in the same manner as in Example 1, except that the channel-free flat PDMS substrate (mold cover) was modified to have a nano line pattern, the microwells of the PDMS substrate (PDMS substrate A) including a engraved pattern had a pentagonal shape, and one expandable particle was placed in (each of) the microwells.

Example 14

Hollow polymer particles were prepared in the same manner as in Example 1, except that the channel-free flat PDMS substrate (mold cover) or the mold was modified to have a nano hole pattern (having a hole diameter of about 600 nm), and two expandable particles were placed in each of the microwells of the PDMS substrate A including a engraved pattern.

Examples 15-16

Hollow polymer particles were prepared in the same manner as in Example 1, except that a device resulting from integrating the PDMS substrate A including a engraved pattern with a channel-free flat PDMS was placed into a hot stage and then heated to about 100° C. at a rate of about 0.1° C./min and 20° C./min, respectively, to expand the expandable particles and thus obtain expanded hollow polymer particles.

Examples 17-18

Hollow polymer particles were prepared in the same manner as in Example 2, except that a device resulting from integrating the PDMS substrate A including a engraved pattern with a channel-free flat PDMS substrate was placed into a hot stage and then heated to about 100° C. at a rate of about 0.1° C./min and 20° C./min, respectively, to expand the expandable particles and thus obtain expanded hollow polymer particles.

Comparative Example 1

10 mL of polystylene particles (having a diameter of about 40 um) were mixed with 10 mL of the epoxy mixture (epoxy melt) prepared in Example 3, and then further mixed in a Revolution centrifugal mixer at about 1000 rpm for about 5 minutes, thereby preparing a polymer particle/epoxy resin composite.

Comparative Example 2

To compare the amount of copper present on the surface of the hollow polymer particles of Example 4 with that on the surface of common polymer particles, 0.1 mL of common copper particles (having a diameter of about 10 um) equivalent to the amount of copper present on the surface of the hollow polymer particles coated with copper according to Example 4 were mixed with 10 mL of theepoxy mixture (epoxy melt), and then further mixed in a Revolution centrifugal mixer at about 1000 rpm for about 5 minutes, thereby preparing a polymer particle/epoxy resin composite.

Comparative Example 3

Nanoparticles were prepared using a duplicated mold with microwells having a triangular cross-section having a depth of about 50 μm and a side length of about 150 μm. After the microwells of the duplicated mold were filled with polyethylene glycol diacrylate (PEG-DA, Mw=575, available from Sigma-Aldrich Chemicals), the filled mold was left in a vacuum chamber for about 5 minutes to remove air bubbles from the microwells. An excess of PEG-DA flowing over the microwells was recovered by tilting the duplicated mold or by utilizing capillary force with a pipette tip so that PEG-DA was filled just to the rims of the microwells. Next, while a solvent including about 1 to 5 vol % of 2,2-diethoxyacetophenone (DEAP) as a photoinitiator was applied to cover the upper surface of the microwells, the upper surface of the microwells was imaged with a Nikon TE2000 inverted microscope (TE2000, Nikon, Japan) equipped with a CCD camera (Coolsnap, Photometrics, USA) to observe changes with time. After 20 minutes from the applying of the solvent, the microwells of the duplicated mold were irradiated with ultraviolet (UV) rays of 365 nm using a 8-W small UV lamp (Spectronics Corp., Westbury, N.Y.) for about 2 minutes. After the UV irradiation, the duplicated mold was dipped in IPA (isopropyl alcohol (IPA) to recover polymer microparticles. The solvent used was PDMS oil (Dow Corning) or Fluorinert® FC-40 (available from Sigma).

Evaluation Example 1

Specific Gravity

Specific gravities of the composites prepared according to Example 3 and Comparative Example 1 were measured based on an apparent specific gravity determination method. The results are shown in Table 1.

TABLE 1

| | Example 3 | Comparative Example 1 |
|---|---|---|
| Specific gravity (g/cm$^3$) | 0.08 | 1.10 |

Referring to Table 1, the composite of Example 3 including the hollow polymer particles having pores was found to have a significantly reduced specific gravity, compared to the composite of Comparative Example 1.

Referring to Table 1, the composite of Example 3 including the hollow polymer particles having pores was found to have a significantly reduced specific gravity, compared to the composite of Comparative Example 1.

Evaluation Example 2

Electrical Conductivity and Thermal Conductivity

Electrical conductivity and thermal conductivity of the composite of Example 4 were compared with those of the composite of Comparative Example 2.

After the composites of Example 4 and Comparative Example 2 were processed to have a thickness of about 2 mm, electrical conductivity and thermal diffusivity thereof were determined based on the methods according to ASTM F 390 and ASTM E 1461-92, respectively. The thermal diffusivity was converted into electrical conductivity by multiplying density by specific heat. The resulting electrical conductivity and thermal conductivity values are shown in Table 2.

TABLE 2

| | Example 4 | Comparative Example 2 |
|---|---|---|
| Electrical conductivity (S/cm) | 6.0 × 10$^2$ | 1.0 × 10$^{-6}$ |
| Thermal conductivity (W/mK) | 4.0 | 0.5 |

Referring to Table 2, the polymer hollow particle/epoxy resin composite prepared in Example 4 coated with copper was found to have remarkably improved electrical conductivity and thermal conductivity compared to the copper-coated polymer particle/epoxy resin composite prepared in Comparative Example 2, due to an efficient conduction effect of the copper-coated electrical and thermal conduction paths.

Evaluation Example 3

Optical Microscopy

1) Examples 1, 5-6

Figure 2A:
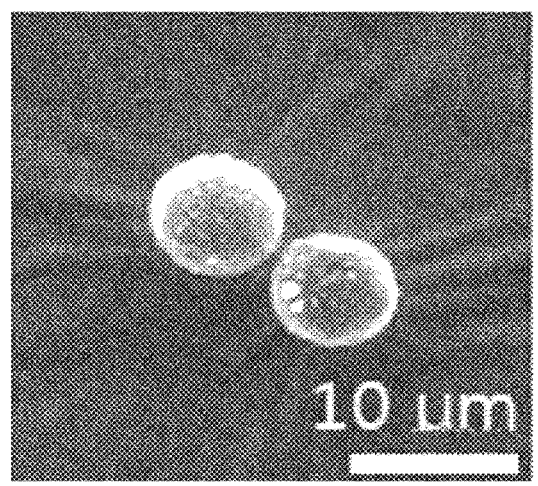
FIGS. 2A to 2C are optical microscopy images of hollow polymer particles prepared according to Examples 1, 5, and 6, respectively.
Figure 2B:
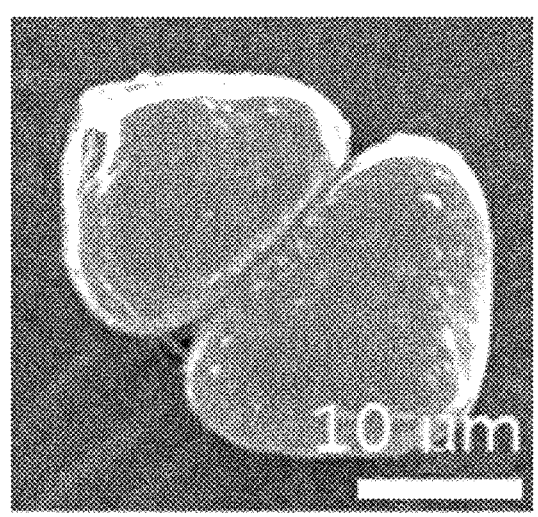
Figure 2C:
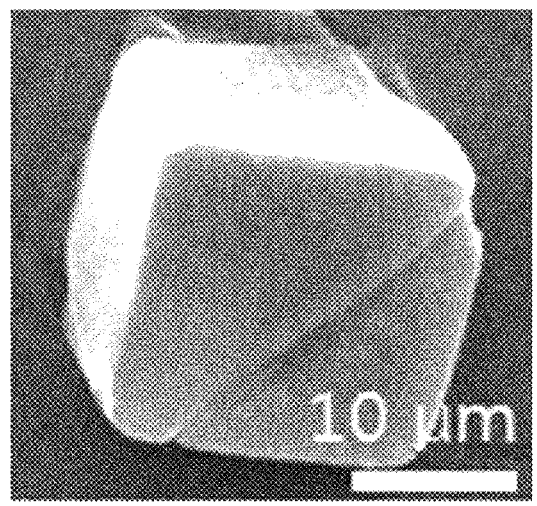

The hollow polymer particles prepared according to Examples 1, 5, and 6 were analyzed using an optical microscope. The analysis results are shown in FIGS. 2A to 2C. The optical microscope used was a Leica DM2500 (available from Leica Microsystems)

When the expandable particles in the microwells were heated to about 90° C., unexpanded microparticles were observed as shown in FIG. 2A. Referring to FIG. 2A, when the expanded particles in the microwells were heated to about 100° C., microparticles having round edges were observed.

When the expandable particles in the microwells were heated to about 110° C., microbombs having sharp edges were observed. When the expandable particles in the microwells were heated to about 120° C., microbombs having a rupture structure were observed. There results indicate that the shape of hollow polymer particles may be controlled according to a heat treatment temperature of the expendable particles.

As described above, the shape of the hollow polymer particles may be easily controlled to have round or sharp edges by varying the heat treatment temperature as in Example 1 and Examples 5-7. When an edge shape of target particles is controlled by controlling the shape of a mold as in Comparative Example 3, preparation costs may be increased and the shape of feasible target particles may also be limited.

2) Examples 8-14

The hollow polymer particles prepared according to Examples 8-14 were observed by optical microscopy.

Figure 3A:
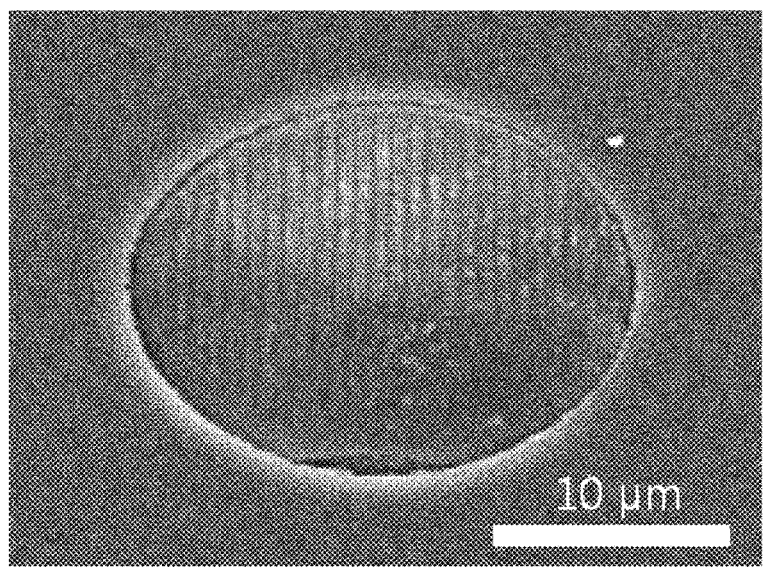
FIGS. 3A to 3G are optical microscopy images of hollow polymer particles prepared according to Examples 7 to 13 (8 to 14), respectively.
Figure 3B:
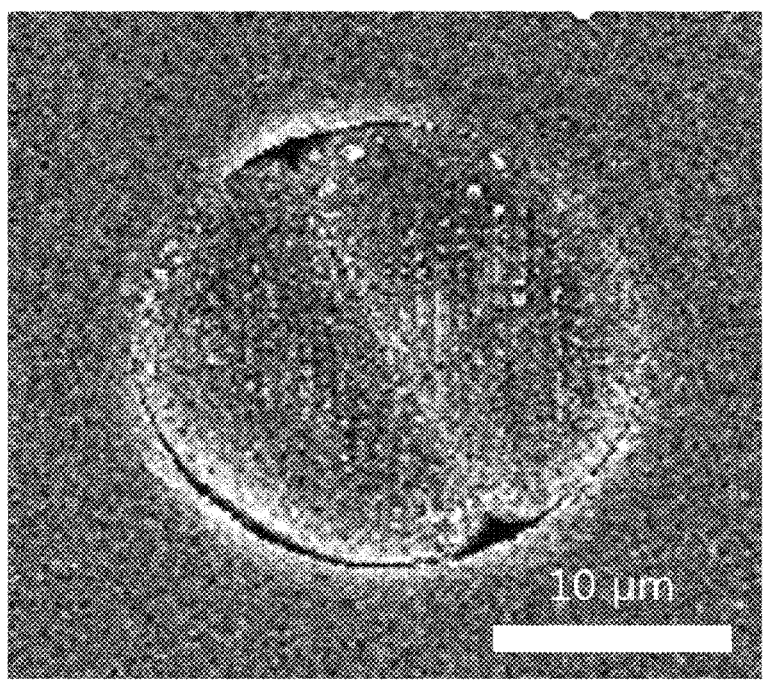
Figure 3C:
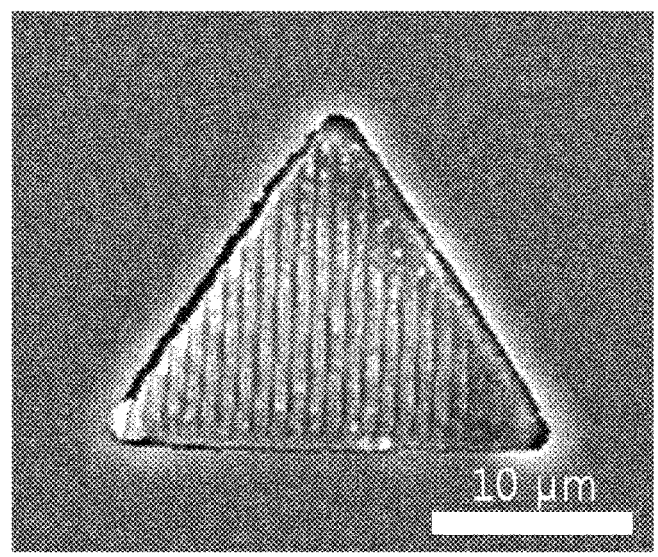
Figure 3D:
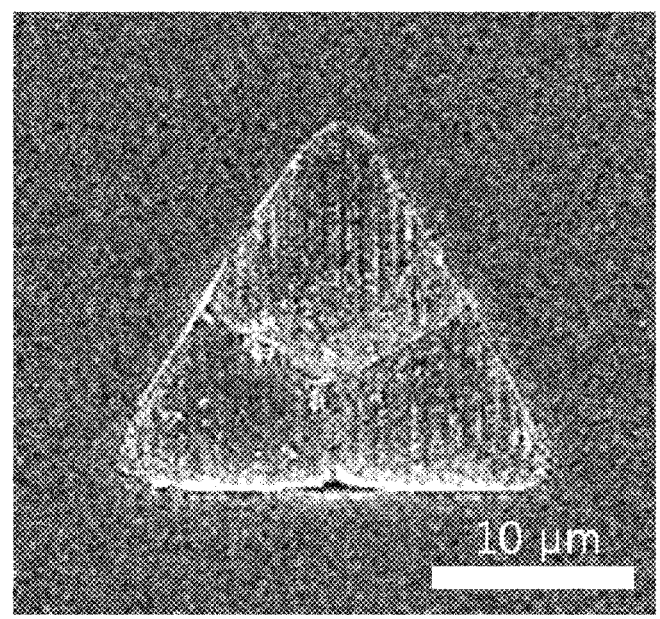
Figure 3E:
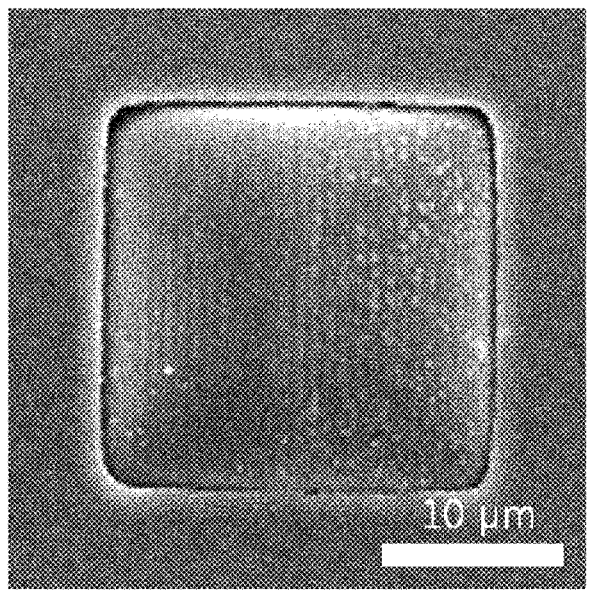
Figure 3F:
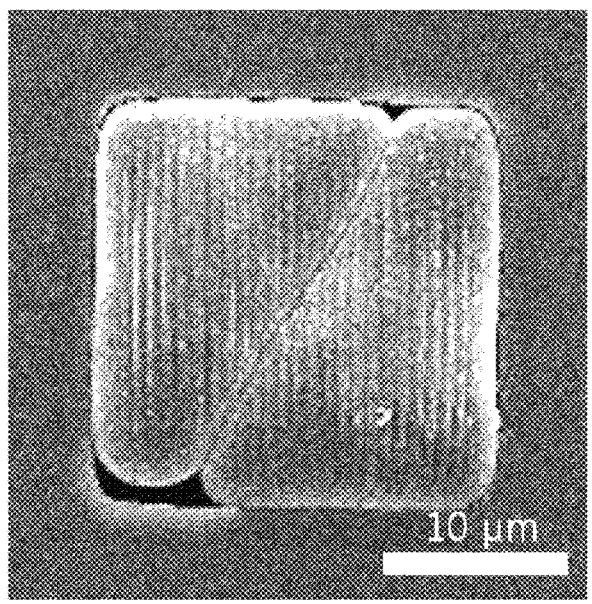
Figure 3G:
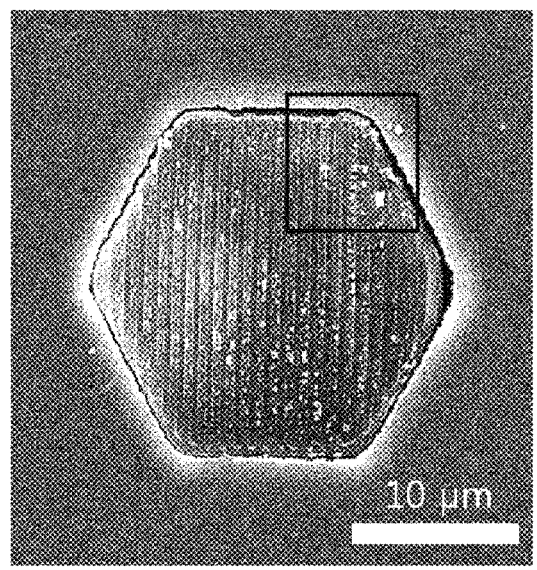
Figure 3H:
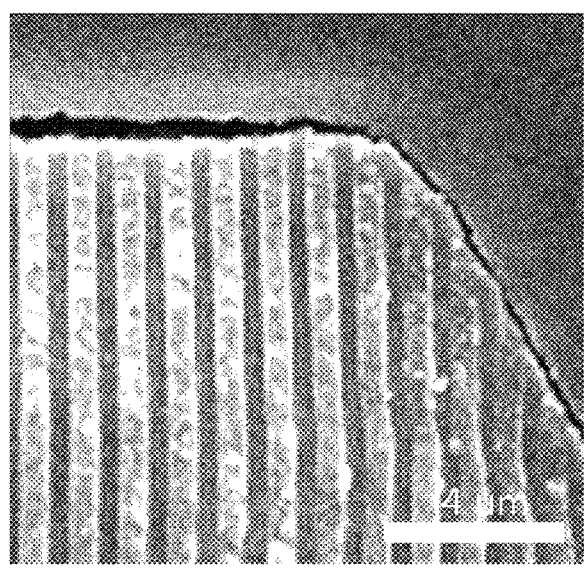
FIG. 3H is a magnified image of a region indicated by a rectangle in FIG. 3G.

The optical microscopy images of the hollow polymer particles of Examples 8-14 are shown in FIGS. 3A to 3H. FIG. 3H is a magnified image of a region delimited by a rectangle in FIG. 3G.

Referring to FIGS. 3A to 3H, the polymer hollows particles of Examples 7-13 were found to have an imprinted linear nanopattern on the surfaces thereof when the nanopattern of the microwells of the mold and the nanopattern of the mold cover were formed as a nano line pattern.

3) Example 14

The hollow polymer particles prepared according to Example 14 were observed by optical microscopy.

Figure 4A:
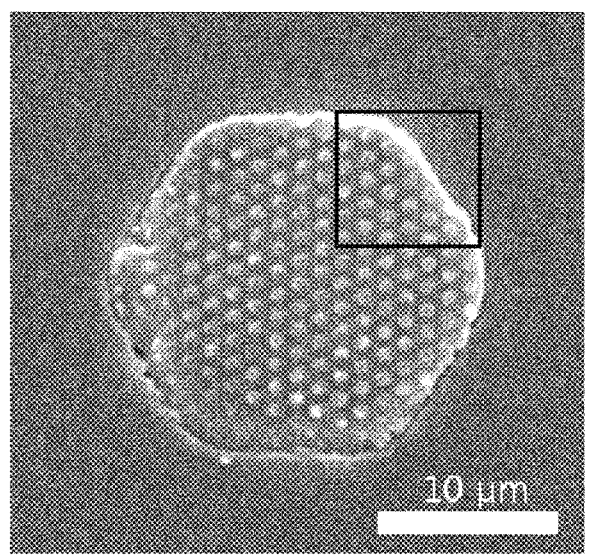
FIG. 4A is an optical microscopy image of a polymer hollow particle prepared according to Example 14.
Figure 4B:
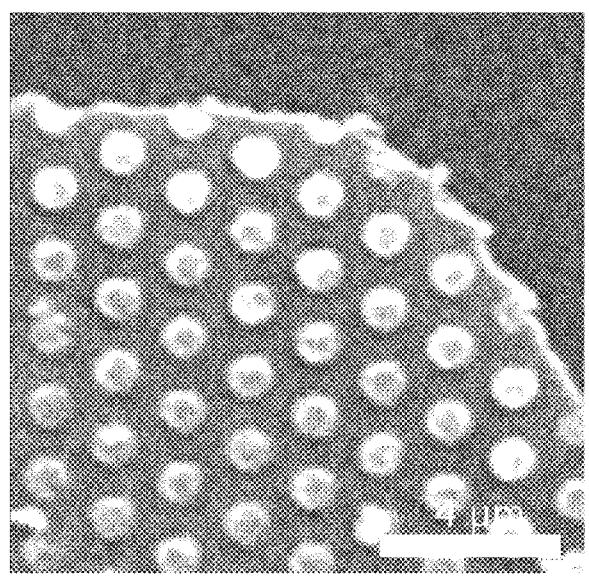
FIG. 4B is a magnified image of a region indicated by a rectangle in FIG. 4A.

The optical microscopy images of the hollow polymer particles of Example 14 are shown in FIGS. 4A and 4B. FIG. 4B is a magnified image of a region delimited by a rectangle in FIG. 4A.

Referring to FIGS. 4A and 4B, the hollow polymer particles of Example 14 were found to have an imprinted nanopattern of holes on the surfaces thereof when the nanopattern of the microwells of the mold and the nanopattern of the mold cover were formed as a hole pattern.

Evaluation Example 4

Observation of Limited Expansion Behavior

To observe limited expansion behavior of the hollow polymer particles prepared in Example 1, the expansion behavior of the hollow polymer particles was tracked in real time during the preparation process.

According to a result of the observation, the shape of the final polymer hollow particle was determined according to the pattern shape of the microwells of the mold, and the expansion ratio of individual polymer hole particles was increased with time.

Evaluation Example 5

Particle Size Distribution Characteristic

Particle size distribution characteristics of the hollow polymer particles prepared according to Examples 1 and 2 and the polymer particles prepared according to Comparative Example 3 were evaluated.

According to a result of the evaluation, the hollow polymer particles of Examples 1 and 2 were found to be monodispersed particles having a uniform particle size, while the polymer particles of Comparative Example 3 were found to be polydispersed particles having different particle sizes, unlike the hollow polymer particles of Examples 1 and 2.

Particle size distribution characteristics of the hollow polymer particles prepared according to Examples 15 to 18 were also evaluated. As a result, the hollow polymer particles of Examples 15 to 18 were also found to be monodispersed particles having a uniform particle size, like the hollow polymer particles of Examples 1 and 2.

As described above, according to the one or more embodiments, hollow polymer particles having different shapes may be prepared using thermally expandable particles. The shape of the hollow polymer particles may be easy controlled according to a pattern shape of a mold as the expandable particles applied into the pattern of the mold are heated to expand to fit to the shape of the pattern, and the hollow polymer particles may have a low specific gravity.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. A method of preparing polymer hollow particles, the method comprising:
    a first step of providing, onto a substrate including an engraved pattern, at least one expandable particle comprising a foaming agent-containing expandable core and a thermoplastic polymer shell;
    a second step of removing an excess of the at least one expandable particle from a resulting product of the first step;
    a third step of expanding the at least one expandable particle in the engraved pattern of the substrate by thermally treating a resulting product of the second step; and
    a fourth step of separating, from the substrate, expanded hollow polymer particles which are a resulting product of the third step,
    wherein the at least one expandable particle is provided as monodispersed or polydispersed particles into the engraved pattern of the substrate in the first step, and the hollow polymer particles in the fourth step are monodispersed particles.

2. The method of claim 1, wherein, in the first step, the at least one expandable particle comprising the expandable core and the thermoplastic polymer shell is provided with a solvent as a mixture onto the substrate including the engraved pattern, or is provided onto the substrate including the engraved pattern in a dry manner.

3. The method of claim 1, wherein the thermal treating in the third step is performed at a temperature of about 50° C. to about 170° C.

4. The method of claim 1, wherein the forming foaming agent comprises a non-fluorine-containing hydrocarbon compound that has a low boiling point and is present in a gaseous phase at a temperature equal to or lower than a softening point of a thermoplastic resin in the thermoplastic polymer shell.

5. The method of claim 1, wherein the thermoplastic resin in the thermoplastic polymer shell of the at least one expandable particle comprises a polymer obtained from a polymerizable monomer or a polymer obtained as a reaction product of a polymerizable monomer and a cross-linking agent,
the polymerizable monomer comprises at least one selected from the group consisting of a nitrile monomer, a carboxylic acid monomer, a (meth)acrylic acid ester monomer, an acrylamide monomer, a maleimide monomer, a vinyl ether monomer, a vinyl ketone monomer, an aromatic divinyl monomer, a N-vinyl monomer, a halogenated vinyl monomer, and a combination thereof, and
the cross-linking agent comprises at least one selected from the group consisting of allyl methacrylate, triacryl formal, triallyl isocyanate, ethylene glycol di(meth) acrylate, diethylene glycol di(meth)acrylate, triethylene glycol di(meth)acrylate, 1,4-butanediol di(meth) acrylate, 1,9-nonanediol di(meth)acrylate, 1, 10-decanediol di(meth)acrylate, polyethylene glycol di(meth)acrylate, neopentyl glycoldi(meth)acrylate, trimethylolpropane trimethacrylate, glycerol dimethacrylate, dimethylol tricyclodecane diacrylate, pentaerythritol tri(meth)acrylate, pentaerythritol tetraacrylate, dipentaerythritol hexaacrylate, neopentyl glycol acrylate benzoate(Neopentylglycol benzoate acrylate), trimethylol propane acrylate benzoate, 2-hydroxy-3-acryloyloxy propyl methacrylate, hydroxypivalic acid neopentyl glycol diacrylate, ditrimethylolpropane tetraacrylate, 2-butyl-2-ethyl-1,3-propanediol diacrylate, and a combination thereof.

6. The method of claim 1, wherein the thermoplastic resin in the thermoplastic polymer shell of the at least one expandable particle comprises a terpolymer comprising a (meth)acryl first repeating unit, a nitrile second repeating unit, and a third repeating unit having no reactivity with the (meth)acryl first repeating unit and the nitrile second repeating unit,
an amount of the (meth)acryl first repeating unit is about 10 wt % to about 50 wt %, an amount of the nitrile second repeating unit is about 30 wt % to about 80 wt %, and an amount of the third repeating unit is about 10 wt % to about 80 wt %, based on a total weight of the first to third repeating units in the thermoplastic resin.

7. The method of claim 1, wherein the foaming agent in the expandable core of the at least one expandable particle comprises at least one selected from the group consisting of propane, propylene, butene, normal butane, isobutane, isopentane, neopentane, normal pentane, normal hexane, isohexane, heptane, octane, petroleum ether, halogenated methane, tetra alkylsilane, azodicarbonamide, and a combination thereof.

8. The method of claim 1, wherein the substrate including the engraved pattern comprises a line or hole pattern, and the hollow polymer particles each have a line or hole pattern on at least one surface thereof, according to the line or hole pattern of the substrate.

9. The method of claim 1, wherein the hollow polymer particles each have a specific gravity of about 0.001 g/cm$^3$ to about 1 g/cm$^3$.

10. The method of claim 1, wherein each of the expanded hollow polymer particles is in the form of a one-body particle.

11. The method of claim 1, wherein each of the expanded hollow polymer particles is substantially without grain boundary.

12. The method of claim 1, further comprising surface-treating the hollow polymer particles to prevent agglomeration or binding between the particles.

13. The method of claim 1, further comprising surface-treating the hollow polymer particles with a fluorine material.

14. The method of claim 1, further comprising surface-treating the hollow polymer particles with 1,1-difluoroethane.

* * * * *